W. Heaton.
Sheep Rack.
N° 40,101. Patented Sep. 29, 1863.
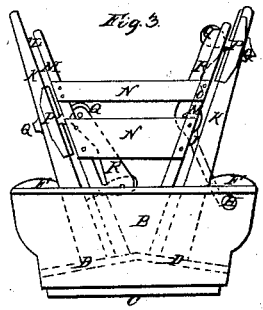
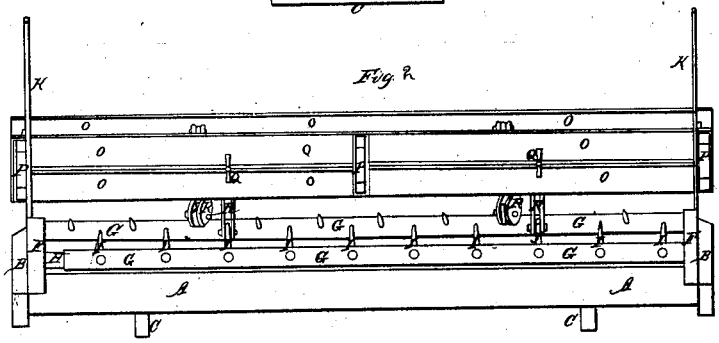
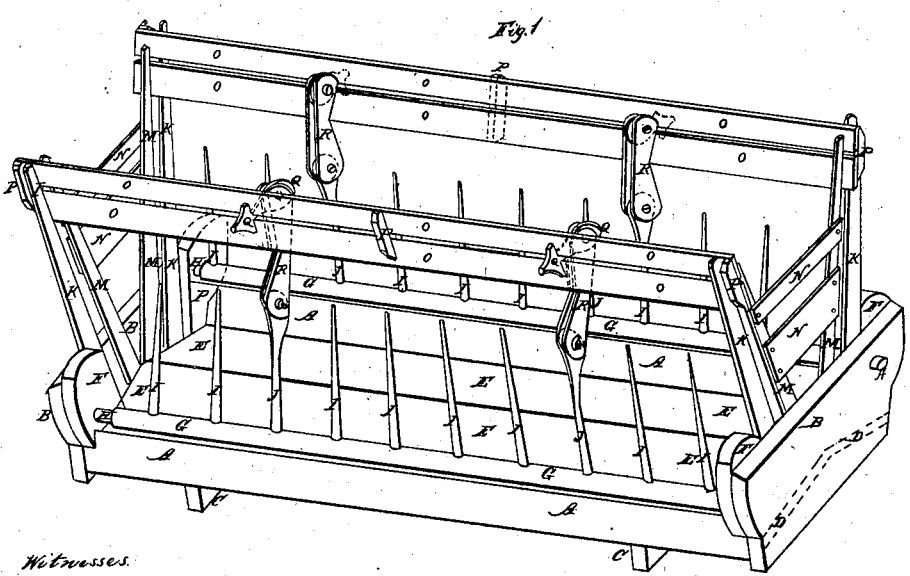
Witnesses.
Jno. S. Gallaher, Sr.
Ed. A. Gallaher
Inventor.
William Heaton.
per
John L. Gallaher Junior

UNITED STATES PATENT OFFICE.

WILLIAM HEATON, OF CENTER TOWNSHIP, GREENE COUNTY, PENNSYLVANIA.

SHEEP-RACK.

Specification of Letters Patent No. 40,101, dated September 29, 1863.

*To all whom it may concern:*

Be it known that I, WILLIAM HEATON, resident of Center township, county of Greene, and State of Pennsylvania, have invented, made, and used certain new and useful Improvements in Combined Troughs and Racks for Feeding Sheep; and I do hereby declare that the following is a full, clear, and exact description of the nature, construction, and use thereof, reference being had to the accompanying drawings, making a part of this specification.

Figure 1 is a perspective view of the combined trough and rack. Fig. 2, is a longitudinal front view of the same. Fig. 3, is an end view of the same.

The nature of my improvements consists in constructing and combining a sliding or gravitating, adjustable rack and double inclined trough for feeding sheep, in such a manner so that there shall be no waste of feed, or any trampling of the same, and also in so supplying hay, straw, or sheaf oats to the rack, that all dust, dirt, chaff or seed are effectually prevented from dropping upon, and mingling with the wool of the sheep, and thus keeping their fleece perfectly clean, while feed of a granulous character, in being deposited in the double sloping trough, slides, or gravitates downwardly toward the animal feeding, and is prevented from being scattered about, thrown out, trampled upon and wasted.

The better to enable others to construct and use my improvements, the following is a full description thereof.

In the perspective view Fig. 1, A indicates two longitudinal, side boards of required length, width and thickness, which are fitted securely to end boards B, said side boards resting on two cross sills C, which are formed with a ridge and double sloping edges of equal length and same inclination outwardly as indicated by the dotted lines D. Upon said sills, is fixed securely a double sloping flooring E, thus forming the desired shaped trough.

Within the four corners of the trough are secured suitable rest blocks F, through which and the end boards B, are circular holes, into which are fitted longitudinal, round shaped bars G, formed with round tenons or journal ends H. One journal of each bar, being longer than the other to admit of ready insertion into their position, by being moved right or left. Into said bars at equal distances apart are inserted a sufficient number of tapering fingers or prongs I, two or more as at J, being broader at their inner ends than the others, and perforated, each with one suitable pin hole. At K, are four inclined, slideway strips, of suitable size and length, formed with short projecting pins or notch like rests L, Fig. 3, and attached to the end boards B, and at M are a second smaller set similarly arranged in position, and confined or braced together by suitable cross tie strips N. The said inclined slide strips are separated (their edges however being parallel) sufficiently, to admit of space in which are fitted to move smoothly the ends of two or more longitudinal, gravitating, sliding shield, or fender boards O, situated with their edges parallel about two inches apart, and fastened together by end, and central battens P. Between the boards at suitable distances apart are knoblike joint blocks Q, formed with flat, or round knobs, their ends flat and broad and perforated, and to which are connected by pins or bolt joints, links R, formed of solid blocks sawed out, or of flat pieces of wood. These links are also connected by pins or bolts to the broad fingers J, thus connecting together the finger rack G I, and the sliding shields or fender boards O. The most convenient and portable size rack-trough I find to be from 12 to 14 feet long, by 3 feet wide, and of proportionate height.

Having set forth and described the construction, and form of my improvements, the application and use thereof are herewith explained. In feeding hay, straw, fodder or sheaf oats, the shield or fender boards O, are raised upwardly and supported upon the projecting or notch-like rests L, of the inclined slide way strips R, Fig. 1. The raising of the fender boards, lifts up and opens out, the finger racks G'—I—J, by the connecting links R, and while elevated and opened out, the desired quantity of hay, straw or other material of food, is deposited over and between the fender boards and fingers, down on the double sloping bottom of the trough, after which the fender boards are released from the projecting pins L, when by their own gravity or weight, the finger rack is closed over, downwardly, onto the mass of hay, or straw, which is held in place and prevented from being scattered, wasted or trampled about; and as the supply in the rack decreases the rack fingers press downwardly thereon, keeping the smallest quantity from being scattered, and dragged out. The fender boards O, are intended to prevent dirt, chaff and seed from falling on to the animal while feeding and thereby keep its skin and wool clean.

In feeding shelled corn, oats, grain or other solid food, it is deposited in the trough and owing to the double sloping thereof, the grain feed slides downwardly by its own gravity, thus getting closer and more conveniently within feeding reach of the animal, and thereby rendering every particle of feed very accessible, to both sides of the trough, and preventing the animal while feeding, from wasting its food, and also from laboriously stretching, or reaching over into the trough for its feed, whereas, in all old and common modes of feeding, the animal rubs or bruises its neck, and lacerates its skin more or less, besides rubbing off its wool to a considerable extent, all of which evils, however, are entirely prevented by the use of my improvements.

From experience and test with my combined rack-trough, I have found a greatly increased saving of feed, with a very greatly improved condition of the animal as regards health and cleanliness, together with complete protection of its wool from all dirt, chaff, seed, and other injurious matter, and thereby improving the quality and quantity of fleece.

Having described the nature, construction and utility of my improvements, and represented the same by the accompanying drawings, what I claim as new, and desire to secure by Letters Patent, is—

The sheep rack provided with the double inclined bottom E, sliding fenders O, and feed holders G, provided with prongs I, the whole constructed, arranged, and operating substantially as herein set forth.

WILLIAM HEATON. [L. S.]

Witnesses:
 WM. T. E. WEBB,
 JNO. FLENNIKEN.